(12) United States Patent
Barth et al.

(10) Patent No.: US 12,496,862 B2
(45) Date of Patent: Dec. 16, 2025

(54) METHOD AND DEVICE FOR AN ASSISTED OR AUTOMATIC COUPLING OF A TRAILER VEHICLE TO A TOWING VEHICLE, TOWING VEHICLE, ELECTRONIC PROCESSING UNIT, AND COMPUTER PROGRAM

(71) Applicant: ZF CV SYSTEMS GLOBAL GMBH, Bern (CH)

(72) Inventors: Christoph Barth, Hannover (DE); Andreas Goers, Pattensen (DE)

(73) Assignee: ZF CV SYSTEMS GLOBAL GMBH, Bern (CH)

( * ) Notice: Subject to any disclaimer, the term of this patent is extended or adjusted under 35 U.S.C. 154(b) by 187 days.

(21) Appl. No.: 18/557,077

(22) PCT Filed: Apr. 8, 2022

(86) PCT No.: PCT/EP2022/059347
§ 371 (c)(1),
(2) Date: Oct. 25, 2023

(87) PCT Pub. No.: WO2022/228858
PCT Pub. Date: Nov. 3, 2022

(65) Prior Publication Data
US 2024/0217285 A1 Jul. 4, 2024

(30) Foreign Application Priority Data
Apr. 26, 2021 (DE) ...................... 10 2021 110 564.1

(51) Int. Cl.
*B60D 1/64* (2006.01)
*B60D 1/01* (2006.01)
(Continued)

(52) U.S. Cl.
CPC ............... *B60D 1/64* (2013.01); *B60D 1/015* (2013.01); *B60D 1/36* (2013.01); *B62D 53/12* (2013.01)

(58) Field of Classification Search
CPC ....... B60W 30/18036; B60W 2710/18; B60W 30/18109; B60W 2520/105;
(Continued)

(56) References Cited

U.S. PATENT DOCUMENTS

2014/0236532 A1 8/2014 Trombley et al.
2019/0039425 A1 2/2019 Dodd et al.
(Continued)

FOREIGN PATENT DOCUMENTS

CN 111819091 A 10/2020
DE 102009045284 A1 4/2011
(Continued)

*Primary Examiner* — Aniss Chad
(74) *Attorney, Agent, or Firm* — LEYDIG, VOIT & MAYER, LTD.

(57) ABSTRACT

Assisted or automatic coupling of a trailer vehicle to a towing vehicle equipped with a coupling element which has a lateral guide for a corresponding coupling counterpart of the trailer vehicle to be inserted into the coupling element, an electronically controlled service brake and a drive unit, includes starting, after alignment and approach of the towing vehicle relative to the trailer vehicle, an automatic coupling process. The automatic coupling process includes starting driving in reverse at a speed and a drive torque, detecting longitudinal and lateral accelerations of the towing vehicle, and stopping driving in reverse by switching off the drive torque and/or applying the service brake if a lateral acceleration occurs in a first range of values with the occurrence of a longitudinal acceleration in a second range of values and subsequent occurrence of a longitudinal acceleration in a third range of values.

17 Claims, 6 Drawing Sheets

(51) Int. Cl.
  *B60D 1/36* (2006.01)
  *B62D 53/12* (2006.01)
(58) Field of Classification Search
  CPC ..... B60W 2520/125; B60W 2554/801; B60W 2554/802; B60W 2710/08; B60W 2710/06; B60D 1/36; B60D 1/366; B60D 1/363; B60D 1/015; B60D 1/62; B60D 1/64; B62D 53/12
  See application file for complete search history.

(56) References Cited

U.S. PATENT DOCUMENTS

| | | | |
|---|---|---|---|
| 2019/0077457 A1 | 3/2019 | Xu et al. | |
| 2019/0241215 A1 | 8/2019 | Schaeper et al. | |
| 2019/0329612 A1 | 10/2019 | Gaufin et al. | |
| 2019/0337343 A1* | 11/2019 | Ramirez Llanos | G06T 7/579 |
| 2020/0132466 A1* | 4/2020 | MacNeille | G05D 1/0088 |
| 2020/0189336 A1* | 6/2020 | Sharma | B60T 7/22 |
| 2020/0331441 A1* | 10/2020 | Sielhorst | B60D 1/62 |
| 2021/0009143 A1* | 1/2021 | Niewiadomski | B60W 50/14 |
| 2021/0039556 A1 | 2/2021 | Hartmann | |
| 2021/0061376 A1* | 3/2021 | Moore | B62D 53/125 |
| 2021/0114597 A1* | 4/2021 | Tagesson | B60W 50/0097 |
| 2022/0017162 A1 | 1/2022 | Clauer et al. | |
| 2022/0153263 A1* | 5/2022 | Hotta | B60W 30/0956 |
| 2022/0324525 A1* | 10/2022 | Vikström | B62D 53/10 |

FOREIGN PATENT DOCUMENTS

| | | |
|---|---|---|
| DE | 102016011323 A1 | 3/2018 |
| DE | 102018122185 A1 | 3/2019 |
| WO | WO 2020109549 A1 | 6/2020 |

\* cited by examiner

METHOD AND DEVICE FOR AN ASSISTED OR AUTOMATIC COUPLING OF A TRAILER VEHICLE TO A TOWING VEHICLE, TOWING VEHICLE, ELECTRONIC PROCESSING UNIT, AND COMPUTER PROGRAM

CROSS REFERENCE TO RELATED APPLICATIONS

This application is a U.S. National Phase application under 35 U.S.C. § 371 of International Application No. PCT/EP2022/059347, filed on Apr. 8, 2022, and claims benefit to German Patent Application No. DE 10 2021 110 564.1, filed on Apr. 26, 2021. The International Application was published in German on Nov. 3, 2022 as WO 2022/228858 A1 under PCT Article 21(2).

FIELD

The invention relates to commercial vehicles, in particular towing vehicles and trailers.

BACKGROUND

In many cases, trailer vehicles are parked at depots of logistics companies and other companies. Often the trailers have to be maneuvered at the depot, for loading, unloading, filling, waiting, parking, etc. Finally, the trailer vehicles are picked up by towing vehicles, which then take them to their destination. There are many varieties of trailer vehicles, including single-axle and multi-axle trailer vehicles. In the case of multi-axle trailer vehicles, a distinction is made as to whether they are equipped with a drawbar or without a drawbar. The multi-axle trailer vehicles which are equipped without a drawbar are referred to as semi-trailer vehicles or internationally as semi-trailers. With these the wheel axles are only at the rear of the trailer vehicle. At the front, these trailer vehicles are equipped with supports or stands that can be extended or unfolded to park the trailer vehicle and retracted or folded in for driving.

For semi-trailer vehicles, the coupling process should be carried out particularly carefully so that there is no damage to the towing vehicle but especially to the trailer vehicle standing on supports. The particular problem is that the towing vehicle is equipped with a coupling element that has a fifth wheel plate. This fifth wheel plate is mounted slightly elevated and rotatably supported. On the rear side, the fifth wheel plate is equipped with a V-shaped opening into which a so-called kingpin of the trailer vehicle can engage. During coupling, the towing vehicle must be reversed so that the kingpin enters the opening of the fifth wheel plate. The lateral guides of the V-shaped opening ensure that the kingpin is directed to the central point of the fifth wheel plate. Latching elements that are attached in front of the central point are held by spring force. In order for the kingpin to snap into the central position, the latching elements must be pushed to the side against the spring force. In order for this to happen, the towing vehicle must therefore press correspondingly hard against the kingpin of the trailer vehicle when reversing until it engages at the central point.

This is exactly what is a difficult task for the driver. He must carry out the longitudinal and transverse control of the towing vehicle at the same time. Often, the view of the kingpin is not optimal when reversing. Furthermore, the driver is often under increased time pressure. Thus reversing at too high a speed happens and the towing vehicle strikes the kingpin of the trailer vehicle with an excessive impulse. The trailer vehicle may be moved slightly to the rear. This leads to twisting of the supports of the trailer vehicle or even to a displacement of the trailer vehicle. This can lead to damage to the supports or the chassis of the trailer vehicle. The coupling element of the towing vehicle is also subjected to more stress than necessary and can therefore wear out more.

When the kingpin is engaged at the central point, the snapped-back latching elements hold the kingpin in position so that the trailer vehicle remains stably connected to the towing vehicle while driving. The latching elements can be released by a mechanism. This is activated by the driver when he wants to uncouple the trailer vehicle.

Thus there is a problem in that the coupling process is often not optimal when carried out manually by the driver, which increases wear and tear and can cause damage. This problem is exacerbated by the fact that the driver is tempted to dock at a higher speed than absolutely necessary. In this way, the driver can avoid failed coupling attempts and does not have to start a new coupling process, for which the driver has to carry out the necessary visual inspection again. To do this, the driver would have to get out again.

Thus there is a need for improvements in the coupling process to prevent damage and reduce wear.

SUMMARY

In an embodiment, the present disclosure provides a method for assisted or automatic coupling of a trailer vehicle to a towing vehicle, wherein the towing vehicle is equipped with a coupling element which has a lateral guide for a corresponding coupling counterpart of the trailer vehicle to be inserted into the coupling element, an electronically controlled service brake and a drive unit. The method comprises starting, after alignment and approach of the towing vehicle relative to the trailer vehicle, an automatic coupling process. The automatic coupling process includes starting driving in reverse at a certain speed and a certain drive torque, detecting longitudinal and lateral accelerations of the towing vehicle, and stopping driving in reverse by switching off the drive torque and/or applying the service brake if a lateral acceleration occurs in a first range of values with the occurrence of a longitudinal acceleration in a second range of values and the subsequent occurrence of a longitudinal acceleration in a third range of values.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
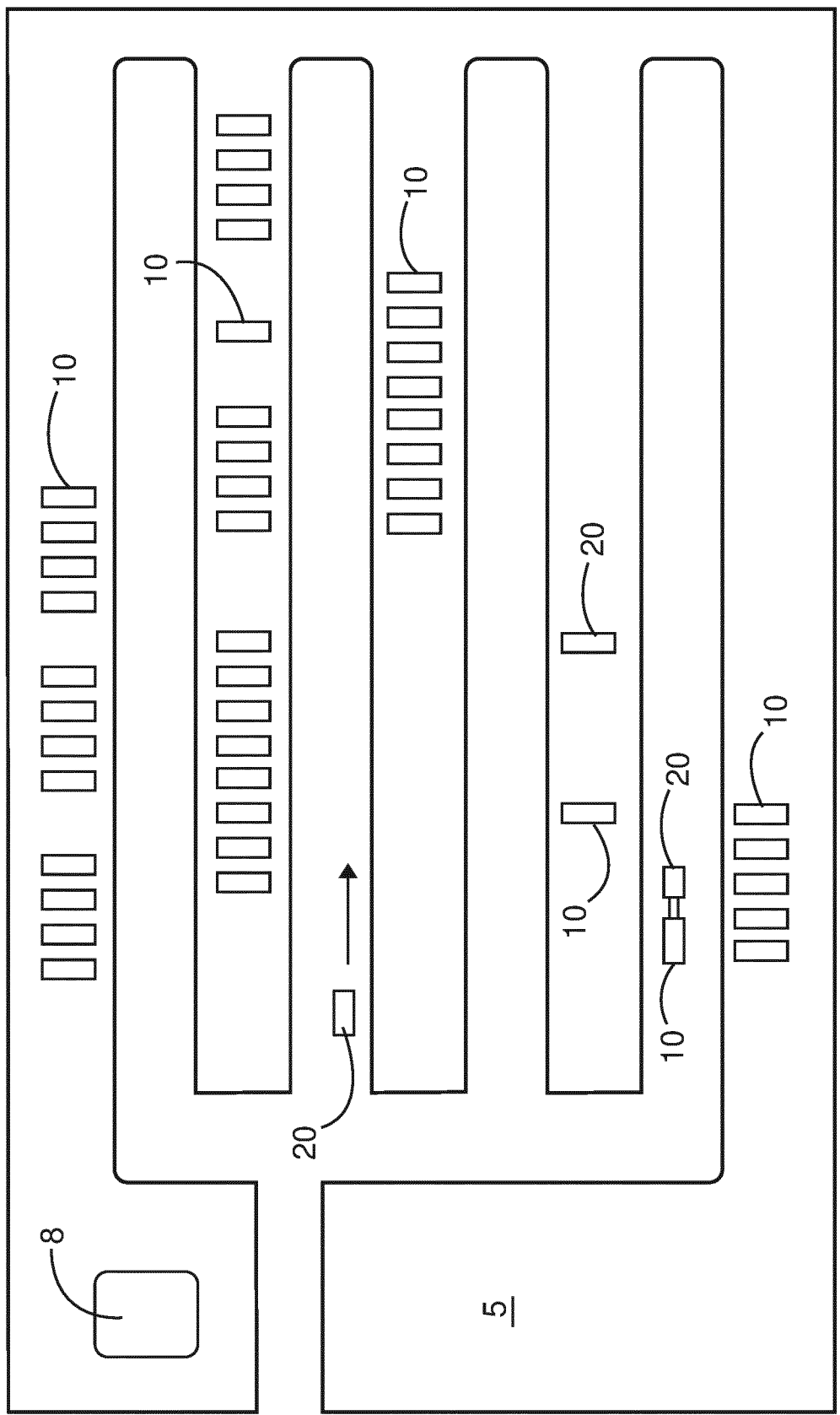
FIG. 1 shows an example of a depot where trailer vehicles are parked, picked up and maneuvered.

In an embodiment, the invention improves the coupling process in such a way as to avoid frequent impacts of the towing vehicle on the trailer vehicle at too high a speed.

This is achieved by a method for assisted or automatic coupling of a trailer vehicle to a towing vehicle as described herein, by a device for assisted or automatic coupling of a trailer vehicle to a towing vehicle as described herein, a towing vehicle as described herein, and an electronic processing unit as described herein.

In an embodiment, the invention relates to a method for the assisted or automatic coupling of a trailer vehicle to a towing vehicle. The towing vehicle is equipped with a coupling element, which has a guide, for example a lateral guide, for a coupling element of the towing vehicle. Furthermore, the towing vehicle is equipped with an electronically controlled service brake and a drive. The method is characterized in that an automatic coupling process is started after alignment and approach of the towing vehicle relative to the trailer vehicle. The automatic coupling process is characterized by the steps of starting driving in reverse at a certain speed and a certain drive torque, detecting the longitudinal and lateral accelerations of the towing vehicle, and stopping the driving in reverse by switching off the drive torque and/or applying the service brake if a lateral acceleration occurs in a first range of values with the occurrence of a longitudinal acceleration in a second range of values and the subsequent occurrence of a longitudinal acceleration in a third range of values. This method has the advantage that the engagement of the coupling counterpart of the trailer vehicle in the coupling element of the towing vehicle is detected by measurement technology, and thus an immediate shutdown of the drive torque of the towing vehicle acting during driving in reverse takes place and displacement of the trailer vehicle by the continued drive torque of the towing vehicle is prevented. This reduces wear and tear and prevents damage to the trailer vehicle and towing vehicle.

In an embodiment of a method according to the invention, the condition is required that the third range of values is at least a certain value greater than the absolute value of the previously recorded lateral acceleration. This has the advantage that contacts between the coupling counterpart of the trailer vehicle and the coupling element of the towing vehicle that do not result in the coupling counterpart snapping into the coupling element of the towing vehicle are excluded.

Particularly advantageous starting conditions for the automatic coupling process are that before starting the driving in reverse the level of the coupling element of the towing vehicle is adjusted to the height of the trailer vehicle by checking in one step whether the coupling element of the towing vehicle is in contact with the chassis of the trailer vehicle and the coupling counterpart of the trailer vehicle is positioned in the capture area of the coupling element of the towing vehicle or there is a confirmation from the driver that the trailer vehicle and the coupling element are aligned in such a way that the coupling counterpart of the trailer vehicle can engage in the coupling element of the towing vehicle. Under these starting conditions, there is no need for lateral guidance of the towing vehicle during the coupling process, because the lateral guidance of the coupling element effectively provides the lateral guidance.

An advantageous design of the method for the assisted or automatic coupling of a trailer vehicle to a towing vehicle is that a certain drive torque of the drive of the towing vehicle is set to start driving in reverse and the speed of the towing vehicle is regulated in such a way that a specified speed is not exceeded. This limits the drive torque and the speed of the towing vehicle. The impulse that occurs during the desired impact of the two coupling elements is thus effectively limited. As a result, damage is prevented and wear is reduced.

The method can be further improved by detecting the number of increments of an incremental encoder while the towing vehicle is driving in reverse from the measurement of the lateral acceleration in a first range of values with simultaneous measurement of the longitudinal acceleration in a second range of values. Such incremental encoders are mainly used in the field of detecting rotational movements. There they are also referred to as an incremental wheel. They work with a sensor that generates an increment signal whenever an increment of the incremental encoder moves past the sensor. These increment signals can be transmitted and counted in a processing unit. The incremental encoders are typically designed in such a way that the increments are arranged equidistantly, so that when an increment signal occurs, the same rotational motion is accompanied by a defined angle of rotation. In the automotive sector, incremental encoders are mounted on the wheels, for example, together with wheel revolution rate sensors as incremental encoder sensors. The generated signals are evaluated by various systems, such as ABS, corresponding to anti-lock braking system and ASR, corresponding to anti-slip regulation.

Furthermore, it is advantageous if the coupling process is aborted immediately if the number of increments detected during driving in reverse exceeds a certain value up to which no longitudinal acceleration has been measured with a value in the third range of values. This is tantamount to an incorrect setting of the height adjustment, because then the kingpin has already passed the actual point of impact.

Another advantageous measure of the method is that after stopping driving in reverse, the service brake on the towing vehicle is released to verify the successful coupling and a brief pull on the trailer vehicle with the towing vehicle is carried out by engaging a forward gear and imposing a certain drive torque for a defined time, during which time the number of increments of the incremental encoder is recorded or the distance between the towing vehicle and the trailer vehicle is measured. If the trailer vehicle is successfully coupled and the parking brake of the trailer vehicle is applied, the trailer vehicle is not or is only slightly pulled during the brief application of the drive torque. Accordingly, the number of increments measured will be low. If the parking brake on the trailer vehicle is released, a larger number of increments will be counted. In order to be able to verify correct coupling in this case, it is advantageous to measure the distance between the trailer vehicle and the towing vehicle during the pulling process. If the distance remains constant within a tolerance range, a successful coupling process has taken place.

Accordingly, it is advantageous if the successful coupling process is confirmed when the recorded number of increments of the incremental encoder does not exceed a certain value, or if the distance between the towing vehicle and the trailer vehicle measured at the end of the pulling process does not exceed the distance measured at the beginning of the pulling process by more than a tolerance value.

An embodiment of the invention comprises of a device for controlling the assisted or automatic coupling of a trailer vehicle to a towing vehicle, wherein the towing vehicle is equipped with a drive unit and a coupling element which has a lateral guide for a corresponding coupling counterpart of the trailer vehicle to be inserted into the coupling element and an electronically controlled service brake. In this embodiment of the invention, the device has an electronic processing unit connected via one or more communication buses to the electronic control unit of the drive unit and the electronic control unit of the service brake. The processing unit is set up to communicate with the electronic control unit of the drive unit and the electronic control unit of the service brake in order to receive measured values regarding longitudinal and lateral accelerations of the towing vehicle from a sensor unit and to transmit control commands to the electronic control unit of the service brake and the electronic control unit of the drive unit in such a way that the method according to an embodiment of the invention for controlling the assisted or automatic coupling of a trailer vehicle to a towing vehicle is carried out. The device thus serves to implement the method according to an embodiment of the invention and with it the corresponding advantages of the method according to an embodiment of the invention can be realized.

The aforementioned sensor unit of the device according to an embodiment of the invention should contain at least a first accelerometer which detects the longitudinal acceleration of the towing vehicle and a second accelerometer which detects the lateral acceleration of the towing vehicle. It is advantageous if the sensor unit is connected to the electronic control unit of the service brake. The electronic service brake requires such a sensor unit, at least in the version in which the functionality of an electronic stability program (ESP) is integrated. Thus, if this sensor unit is already present, it is only necessary to ensure that the sensor readings are cyclically transmitted to the processing unit of the device according to an embodiment of the invention. An additional sensor unit is then not required. This reduces the cost of the device according to embodiments of the invention.

In an embodiment of a device according to the invention, a separate sensor unit which is used to measure the longitudinal and lateral accelerations of the towing vehicle is connected to the processing unit. As a separate sensor unit, an IMU unit, corresponding to Inertial Measurement Unit, can be connected to the electronic processing unit. Such IMU units are used in the automotive sector in large-scale production for certain vehicle dynamics controls, such as ESP. The IMU unit can include multiple accelerometers and rotation rate sensors. The rotation rate sensors can also be used to measure the yaw rate and the vehicle inclination in different directions. In particular, the sensor unit should include at least a first accelerometer that detects the longitudinal acceleration of the towing vehicle and a second accelerometer that detects the lateral acceleration of the towing vehicle.

An advantageous embodiment of a device according to the invention is that one or more incremental encoder sensors are assigned to the electronic control unit of the service brake, wherein an incremental encoder sensor corresponds either to a wheel revolution rate sensor of the towing vehicle or to a revolution rate encoder sensor of the transmission of the towing vehicle. These incremental encoder sensors can detect the movement of the towing vehicle with relatively high resolution, especially when it comes to active wheel revolution rate sensors.

In an embodiment of a device according to the invention, the coupling element of the towing vehicle has a fifth wheel plate. This is used to couple trailer vehicles in the form of semi-trailers. With these, the coupling process must be carried out particularly carefully because the semi-trailer stands on supports.

In an embodiment, the coupling element of the towing vehicle has a jaw coupling. This is also provided with a lateral guide for a coupling counterpart, so that the method according to an embodiment of the invention for coupling a trailer vehicle to a towing vehicle can be adapted to it. The coupling counterpart comprises a drawbar of a drawbar trailer vehicle.

An embodiment of the invention comprises a towing vehicle with a drive unit and an electronically controlled service brake and a coupling element having a lateral guide for a corresponding coupling counterpart of a trailer vehicle to be inserted into the coupling element and a device according to embodiments of the invention as described.

Furthermore, an embodiment of the invention also comprises an electronic processing unit which is connected via one or more communication buses to the electronic control unit of the drive unit and the electronic control unit of the service brake and which is set up to communicate with the drive unit and the electronic control unit of the service brake in order to receive measured values regarding longitudinal and lateral accelerations of the towing vehicle from a sensor unit and to transmit control commands to the electronic control unit of the service brake and the electronic control unit of the drive unit in such a way that the steps of the automatic coupling process can be carried out according to the method according to embodiments of the invention.

Finally, an embodiment of the invention relates to a computer program that has program instructions which, when processed in a processor unit of a computer, lead to the steps of the automatic coupling process being executed according to the method according to embodiments of the invention.

Exemplary embodiments of the invention are shown in the drawings and are explained in more detail below by means of the figures.

The present description illustrates the principles of the disclosure according to embodiments of the invention. It is therefore understood that those skilled in the art will be able to conceive various arrangements which, although not explicitly described herein, embody principles of disclosure according to embodiments of the invention and are also intended to be protected in their scope.

FIG. 1 shows the depot 5 of a logistics company from above. There are parking and storage areas where trailer vehicles 10 but also towing vehicles 20 can be parked. The term trailer vehicle 10 is understood here to mean a trailer vehicle equipped with a coupling system for a towing vehicle 20. These are mainly commercial vehicle trailers. These are often equipped as semi-trailer vehicles with a coupling system in which a so-called kingpin of the trailer vehicle is guided into a fifth wheel plate of the towing vehicle until it clicks into place, creating a rotatable connection between a towing vehicle 20 and a trailer vehicle 10. However, it can also be other trailer vehicles, such as trailer vehicles used in agriculture or trailer vehicles that are attached to construction vehicles. Larger caravans, as well as leisure and sports trailers, can also be considered.

The towing vehicle 20 may be a typical towing vehicle 20. This is equipped with an electronic driving assistant or an electronic driving machine. The driving assistant or automatic driving machine is designed to simplify or automate the coupling process between the towing vehicle and the trailer vehicle. The reference number 8 refers to a central control center of the depot 5. There are different types of trailers, including commercial vehicle trailers. These can differ, for example, in that they are equipped with a drawbar for coupling to the towing vehicle 20 or as a trailer with a fifth wheel plate. Another distinguishing feature concerns the number of axles. The term trailer vehicle used here is intended to refer to all types of trailer vehicles 10 that are designed as semi-trailer vehicles. However, principles of the invention can also be applied to other trailer vehicles, for example implemented as drawbar trailer vehicles.

When a trailer vehicle 10 arrives at a depot 5, it is detected in the central control center 8 and a parking space is assigned to the trailer vehicle. The trailer vehicle will be parked in the assigned place. Typically, a trailer vehicle 10 does not remain at this location until it is picked up, but is moved to another location for reloading, loading or unloading or even for maintenance purposes. In the following, it is assumed that the trailer vehicle has been maneuvered to a parking space ready for collection. The pick-up process is now explained in more detail. The driver who is to pick up the trailer vehicle 10 drives his towing vehicle 20 to the parking space of the trailer vehicle 10 and aligns the towing vehicle 20 with the trailer vehicle 10 in such a way that a coupling process can take place automatically or assisted.

Figure 2:
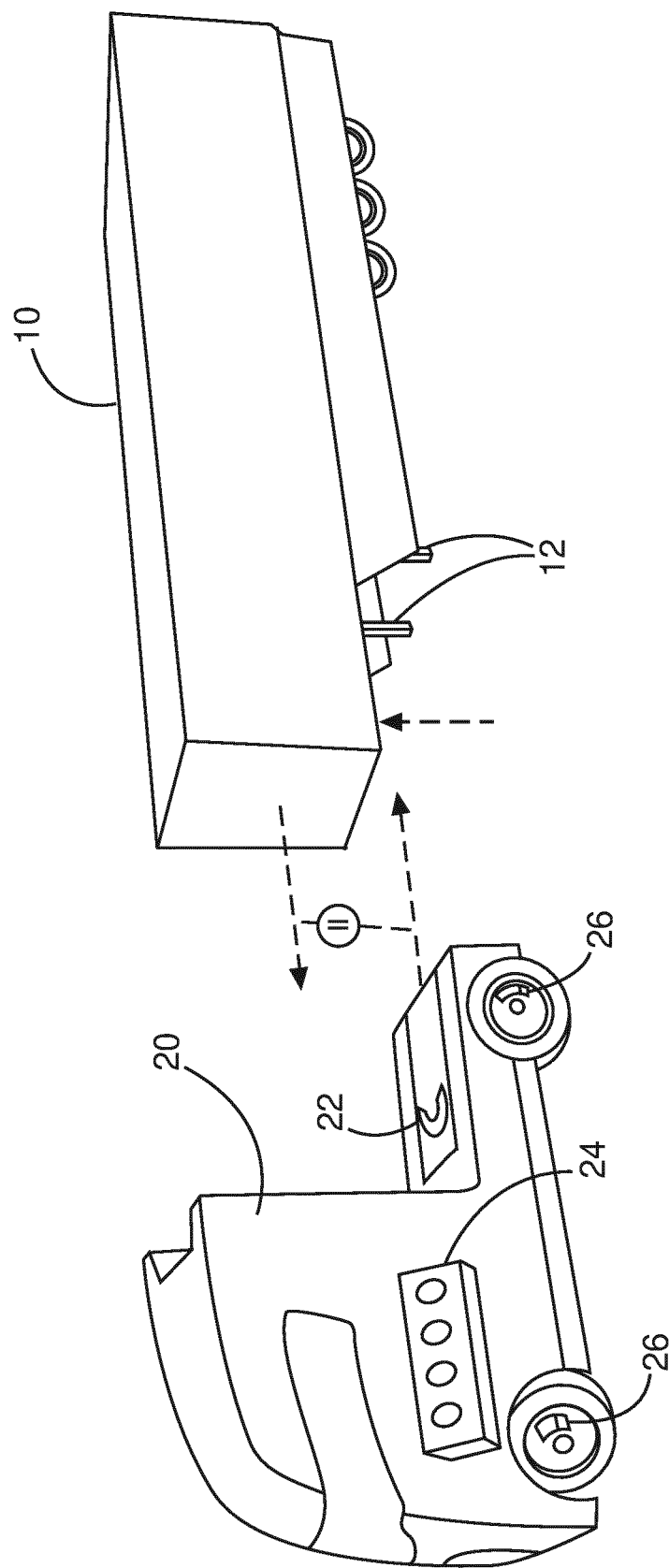
FIG. 2 shows a towing vehicle and a trailer vehicle of a semi-trailer type, wherein the towing vehicle is implemented with the coupling element on the basis of a fifth wheel plate and the trailer vehicle is implemented for coupling to the coupling element with a fifth wheel plate.

FIG. 2 shows the towing vehicle 20 in alignment with the trailer vehicle 10 ready for collection. As shown, this is a semi-trailer trailer vehicle that has only rear wheel axles and stands on extendable or folding supports 12 at the front. First, the towing vehicle 20 is aligned longitudinally with the trailer vehicle 10 in such a way that the kingpin enters the capture area of the V-shaped opening of the fifth wheel plate 22-1 when the towing vehicle 20 continues to reverse. In a first embodiment of the invention, this driving function is still carried out by the driver of the towing vehicle 20. The alignment includes a check of whether the fifth wheel plate 22 of the towing vehicle 20 is in contact with the chassis of the trailer vehicle 10. The fifth wheel plate 22-1 is typically mounted at an angle so that it is lower with the open side than with the closed side facing the cab. This can be done by visual inspection by the driver or automatically by closing a contact when contact occurs and issuing a message to the driver in the cockpit of the towing vehicle 20.

The driver that has parked the trailer vehicle 10 has also disconnected the electrical and pneumatic connection lines to the towing vehicle 20. When the connecting cables are loosened, the spring-loaded parking brake of the trailer vehicle 10 is automatically actuated. This is done with the help of so-called tristop cylinders on all or individual wheels of the trailer vehicle 10 that are equipped with spring-loaded devices. They use spring force to ensure that the brake is applied as soon as the tristop cylinder is no longer pressurized. However, the trailer vehicle 10 is also equipped with a pressure accumulator. As long as this pressure is sufficient, the spring-loaded parking brake can be released again by increasing the pressure in the tristop cylinder. For this purpose, today's trailer vehicles with pneumatic brakes are additionally equipped with a parking release safety valve. When the trailer is parked, the parking brake is applied either by the driver applying the handbrake in the towing vehicle 20 or by uncoupling the red coupling head from the towing vehicle 20. With the black actuation button on the parking release safety valve (release button of the service braking system), the brake system can be released manually after automatic braking when the vehicle is parked without a compressed air supply to the towing vehicle 20, if there is sufficient supply pressure in the pressure accumulator. With the red actuation button (actuation of the parking brake system), the parking brake can be engaged or released again by venting the spring-loaded accumulators. If the supply pressure of the parked trailer drops, the spring-loaded accumulators automatically take over the braking effect and secure the vehicle against rolling away. At depots, however, it is often the case that the parking brake is released manually by the operating personnel. This should enable faster coupling and uncoupling. For frequent maneuvering operations at the depot, this can lead to time savings. It is therefore assumed below for the coupling process that the parking brake of the trailer vehicle 10 is either applied or released. When the parking brake is applied, the trailer vehicle 10 is secured against rolling away. Otherwise, however, it is not. A certain stability is provided by the fact that the supports 12 on which the trailer vehicle 10 stands provide frictional resistance, which also provide a lower protection against rolling away.

Figure 3:
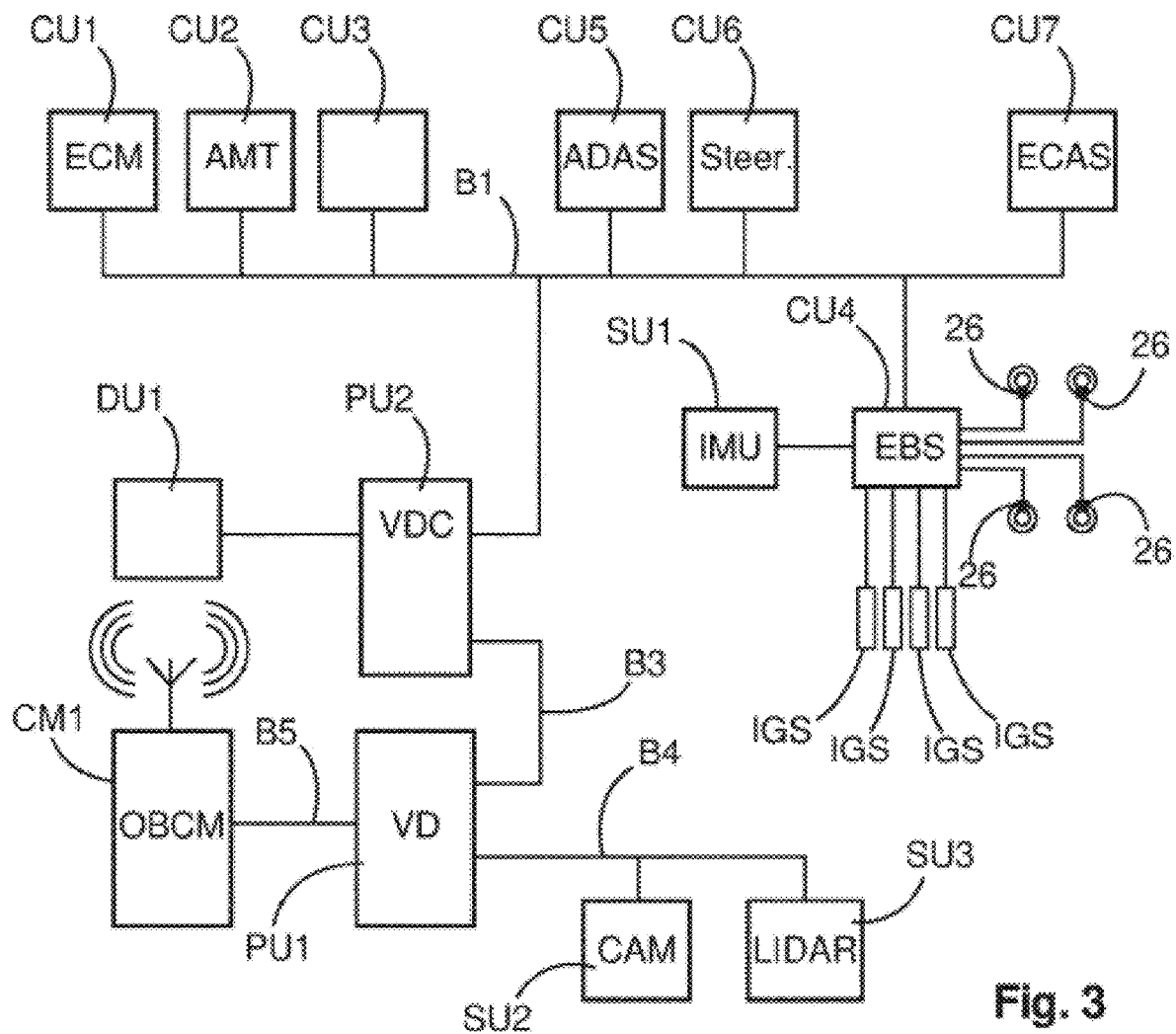
FIG. 3 shows a block diagram of the electronic equipment of a towing vehicle.

FIG. 3 shows the structure of an exemplary vehicle electronic system of the towing vehicle 20. Various electronic control units are provided. Block CU1 refers to an electronic motor control system (ECM), or "Engine Control Module". Block CU2 refers to an automatic transmission control unit AMT, corresponding to "Automated Manual Transmission". Block CU3 refers to an electronic control unit of the retarder unit. This is used to support a braking process and can prevent the friction brakes on the wheels from overheating. Block CU4 refers to an electronic brake control unit EBS, corresponding to "Electronic Braking System". The reference number 26 represents a service brake per wheel. Each service brake 26 can be operated separately by the electronic brake control unit EBS. For this purpose, the corresponding brake lines are connected to the electronic brake control unit EBS. The reference sign IGS refers to incremental encoder sensors. These are connected to the electronic braking system EBS of the towing vehicle 20. Typically, these are magnetic field sensors. An incremental encoder mounted on the wheel rims is designed like a gear wheel and has teeth all around. The gear wheel is typically made of ferromagnetic material. It can be a material suitable for permanent magnets. With the incremental encoder sensor IGS, an electrical impulse is generated when a tooth of the gear wheel moves past the incremental encoder sensor IGS during its rotational motion. To ensure that the pulse can be measured well, the distance between the rotating incremental encoder and the incremental encoder sensor IGS is selected to be small.

There are two different types of incremental encoder sensors that can be considered as incremental encoder sensors. The passive sensors are equipped with a coil and a magnet as inductive encoders. Due to the rotational movement of an increment wheel passing close to the incremental encoder sensor, a periodic change of the magnetic field results, which induces a voltage in the coil of the incremental encoder sensor. However, inductive wheel revolution rate sensors based on this have the problem that they only emit a signal that can be evaluated above a certain wheel revolution rate. With these, the signal amplitude depends on the wheel revolution rate (frequency) and the extent of the air gap between the wheel revolution rate sensor and the incremental encoder sensor. These disadvantages led to the development of active sensors that detect the rotary movement with Hall sensors, but the signals of which have to be processed in dedicated evaluation electronics. The Hall sensor works according to the Hall principle and has the special feature that it is also possible to detect the direction of rotation. Formally, active and passive wheel revolution rate sensors can be distinguished as follows: If a sensor is first "activated" by applying a supply voltage and then generates an output signal, this sensor is referred to as "active". If a sensor operates without an additional supply voltage, this sensor is referred to as "passive".

Figure 4:
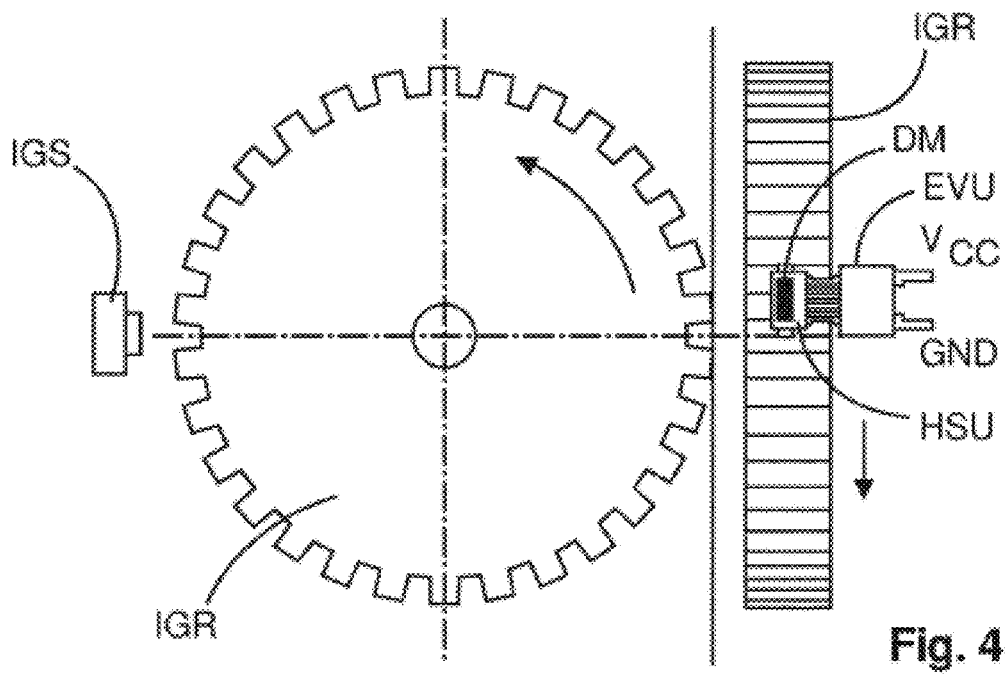
FIG. 4 shows the use of an incremental encoder in combination with an active incremental encoder sensor for detecting the rotational motion of a wheel of a vehicle.

FIG. 4 shows an active incremental encoder sensor IGS, which works together with an incremental encoder in the form of an increment wheel IGR. In the case shown, it works together with an increment wheel IGR that is rigidly connected to a wheel of the towing vehicle 20 or the drive shaft thereof, the rotational movement of which is to be detected. The incremental encoder sensor IGS is mounted directly above the increment wheel IGR. The incremental encoder sensor IGS is in the form of an active wheel revolution rate sensor and essentially comprises 2 components. A sensor unit HS in which a single or multiple sensor elements is or are arranged. Examples of such sensor elements are magnetic field sensors, in particular Hall sensors or magnetoresistive resistors. However, other sensor elements could also be used, such as inductive sensors or optical sensors. The other essential component concerns evaluation electronics EVU. The increment wheel IGR is preferably made of metal and has a number of teeth. For example, 100 teeth could be formed on the outer circumference. The number of teeth also determines the resolution with which the incremental encoder sensor IGS can measure the rotation of the wheel. With 100 teeth, the resolution for a 19" wheel is about 1.5 cm. A permanent magnet DM attached to the HSU sensor unit has a magnetic effect that reaches to the increment wheel IGR. The rotational movement of the increment wheel IGR and the associated change of tooth and tooth gap causes a change in the magnetic flux through the sensor unit HS. This changing magnetic field generates a measurable alternating voltage in the sensor elements. From this, increment signals can be generated, for example in the form of square wave signals, the periodically recurring profile of which can be counted by an increment counter.

A pole ring can also be used as an incremental encoder, which is rigidly connected to the wheel or its drive shaft. The pole ring is typically used in a sealing ring of a wheel bearing. The pole ring has alternating magnetized zones with the magnetic poles N, S. The Hall sensors located in the sensor unit, which detect an alternating magnetic field when the multipole ring rotates, generate an alternating current signal that can be converted into a high-resolution square wave signal with square wave pulses that can be counted by the increment counter. In this respect, the pole ring can also be understood as an incremental encoder.

Another sensor unit SU1 is connected to the processing unit CU4 shown in FIG. 3. This sensor unit SU1 contains at least two accelerometers, one of which detects the acceleration of the towing vehicle 20 in the longitudinal direction and the other accelerometer detects the acceleration in the lateral direction. The sensor unit SU1 can optionally include additional sensors. Typically, a so-called IMU unit corresponding to "Inertial Measurement Unit" can be used as the sensor unit SU1. Such IMU units are known and often still contain yaw rate sensors with which the vehicle inclination, yaw rate, etc. can be detected. A suitable installation location for the IMU unit SU1 is a central location on the chassis of the towing vehicle 20. If the towing vehicle 20 is equipped with a vehicle stabilization function, then such an IMU unit SU1 is required. In the case described, there is no separate control unit for vehicle stabilization that keeps the vehicle stable on course by intervening in the motor control and/or brake control and/or chassis control by counteracting the centrifugal forces that occur. Instead, the electronic braking system EBS includes this function. Alternatively, a separate control unit can be provided for vehicle stabilization. Such a control unit is also called an ESC control unit, corresponding to "Electronic Stability Control".

Block CU5 refers to an electronic control unit of a driver assistance system ADAS, corresponding to "advanced driving assistance system". For example, it can be a lane departure warning system that helps the driver to stay in lane when the vehicle is traveling on a multi-lane road, for example a motorway. Another variant of an assistance system is an automatic distance control system that automatically maintains the distance to the vehicle in front. Block CU6 refers to an electronic control system for a steering system of a towing vehicle 20. Block CU8 refers to an electronic control system for an air suspension system ECAS of the towing vehicle 20, corresponding to "Electronic Control Air Suspension System". By means of this, the vehicle level can be raised or lowered. It can also be used to adapt the driving behavior to different road conditions.

These electronic control units are networked with each other via a bus system B1. For this purpose, a bus system designed for in-vehicle communication can be used. Typically, serial bus systems are used for this purpose, as they require the least amount of cabling. Possible examples are a CAN bus system, corresponding to Controller Area Network. There are different variants of the CAN bus system such as CAN Low Speed and CAN High Speed for different data rates from 125 kbit/s, up to 1000 kbit/s. Furthermore, an extended CAN bus was specified under the name CAN-FD bus, where FD stands for "Flexible Data Rate". This specification defines an extended data frame with higher transport capacity, where the payload field is enlarged. Other automotive bus systems are known as Flexray and Automotive Ethernet, which can also be used to network the electronic control unit. The bus architecture is shown in FIG. 3 for the bus B1 in such a way that a common bus line is used. Deviating from this type of representation, it is also possible to provide several different bus lines for this purpose, wherein only selected control units are connected to one of these bus lines. This is particularly necessary if the data rate is not sufficient to supply all control units with data at the same time via one bus line. In order for the data to be forwarded to other control units, it is then necessary to provide one or more gateway stations that can receive the data via a connected bus and forward it to another bus. If the two bus systems for reception and forwarding are different bus systems, the gateway station is set up to perform the necessary protocol conversion.

The vehicle electronics system further comprises the two processing units PU1 and PU2. These are processing units that can work together to provide one or more automatic driving functions.

As is well known, the SAE "Society of Automotive Engineering" has defined various levels for the automatic driving functions. At level 1, the driver must still be in control, while at level 5, the vehicle drives fully autonomously and the driver can turn his attention to other things.

The processing unit PU1, also referred to as the "Virtual Driver", can determine a trajectory on which the towing vehicle 20 is to move in the following period. The period can range from a few ms to several minutes. For this purpose, the processing unit PU1 can be connected to a number of environmental detection sensors via another bus system B4. As an example, one or more cameras SU2 and a LIDAR sensor SU3 are shown in FIG. 3. The cameras SU2 can correspond to standard video cameras. Alternatively or additionally, a RADAR sensor, one or more IR cameras, and one or more ultrasonic sensors can be connected for environmental detection. As a suitable bus system B4, which is suitable for the transmission of camera data and LIDAR data, the Automotive Ethernet Bus System in the variant IEEE 100BaseT1 or IEEE 1000Base-T1 is mentioned as an example.

The processing unit PU1 sends the trajectory predicted for the corresponding period to the processing unit PU2 via the communication bus B3. The second processing unit PU2 is provided to convert the specified trajectory into corresponding control commands for the various control units and to steer the vehicle in such a way that the vehicle travels on the specified trajectory. These control commands are transmitted via the bus B1 to the various control units CU1 to CU7. This processing unit PU2 can therefore be referred to as a "virtual driving coordinator". This processing unit PU2 is of particular importance for "autonomous driving" because the unit must have precise knowledge of the control commands to be expected from the electronic control devices and their effects. A display unit DU1 is also connected to the processing unit PU1. This is advantageously arranged as a touch-sensitive display unit (touch screen) in the cockpit of the towing vehicle 20. This allows a wide range of operations to be carried out. For this purpose, operating menus are displayed on the display unit. The driver can select menu items, change parameter settings and perform inputs, as is known from smartphones or tablets, for example. The display unit DU1 is connected to the processing unit PU2 via a bus connection. This is used to transmit the display data and transfer the operating commands and inputs entered by the driver from the display unit DU1 to the processing unit PU1. As an example, the LVDS bus system is mentioned, corresponding to Low Voltage Differential Signal, which was developed for these purposes.

FIG. 3 also shows a communication module CM1, which is connected to the processing unit PU1 via the communication bus B5. This communication module CM1 is equipped for wireless communication with other vehicles and connection to public communication systems, such as public cellular communication systems, for example LTE and 5G. The vehicle can also use it to connect to the Internet. For communication with other vehicles, for example, a WLAN module can be provided in the communication module CM1, or the so-called "sidelink" communication capability of the LTE modem or the so-called "PC5" communication capability of the 5G modem can be used for this purpose.

Figure 5:
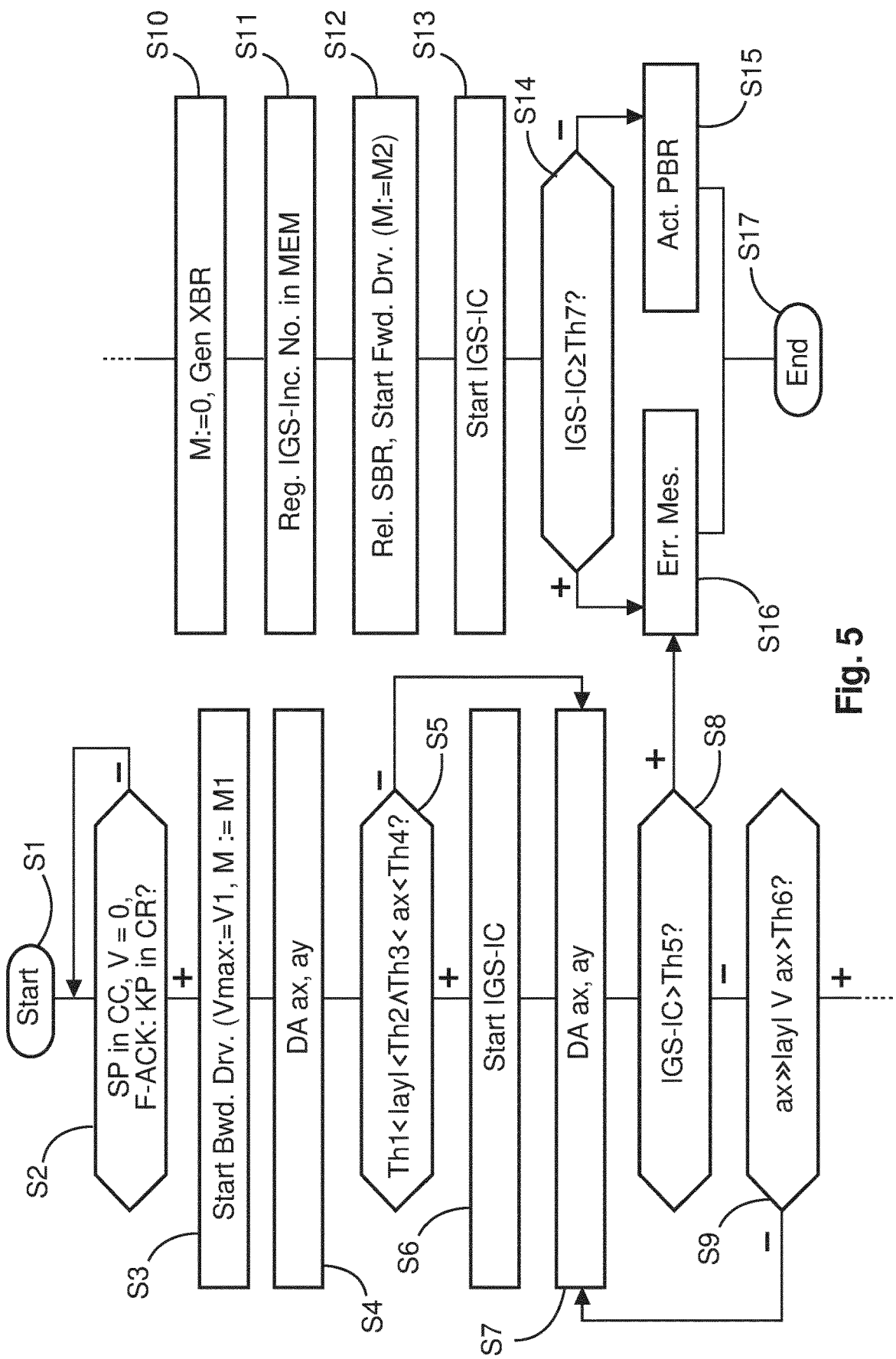
FIG. 5 shows a flowchart for a computer program for implementing the method according to an embodiment of the invention.

The functionality of the vehicle electronics for supporting the coupling process is now explained using the flow diagram in FIG. 5. This is designed for the assisted coupling maneuver. The driver has already carried out the pre-alignment of the towing vehicle 20 in relation to the parked trailer vehicle 10 and requested the assistance function for the coupling maneuver by pressing a switch or selecting a menu item in a user menu on the display unit DU1. The associated computer program is processed by a processor unit in the processing unit PU2. The start of the program for the standby mode is denoted with the reference sign S1. In program step S2, the program waits for confirmation from the driver that the towing vehicle 20 and the trailer vehicle 10 are correctly aligned and that the fifth wheel plate 22-1 is in contact with the chassis of the trailer vehicle 10 and that the kingpin 14 is in the capture area 22-5 of the fifth wheel plate 22-1. The fifth wheel plate is adjustable in height. The driver can use the adjustment device to select the height of the fifth wheel plate 22-1 accordingly. The process of height alignment is indicated in FIG. 2 by a vertical arrow. One possibility of adjusting the height is to adjust the level of the towing vehicle. This possibility exists for vehicles with air suspension systems. Another form of height adjustment is the possibility of equipping the fifth wheel plate with hydraulics, which causes the height adjustment of the fifth wheel plate. The process of longitudinal alignment is indicated in FIG. 2 by two horizontal arrows. The longitudinal axes of the towing vehicle 20 and the trailer vehicle 10 should be aligned in parallel. Furthermore, care must be taken to ensure that the towing vehicle 20 is aligned centrally to the front of the trailer vehicle 10 so that the kingpin 14 reaches the capture area 22-5 of the fifth wheel plate 22-1.

Figure 6:
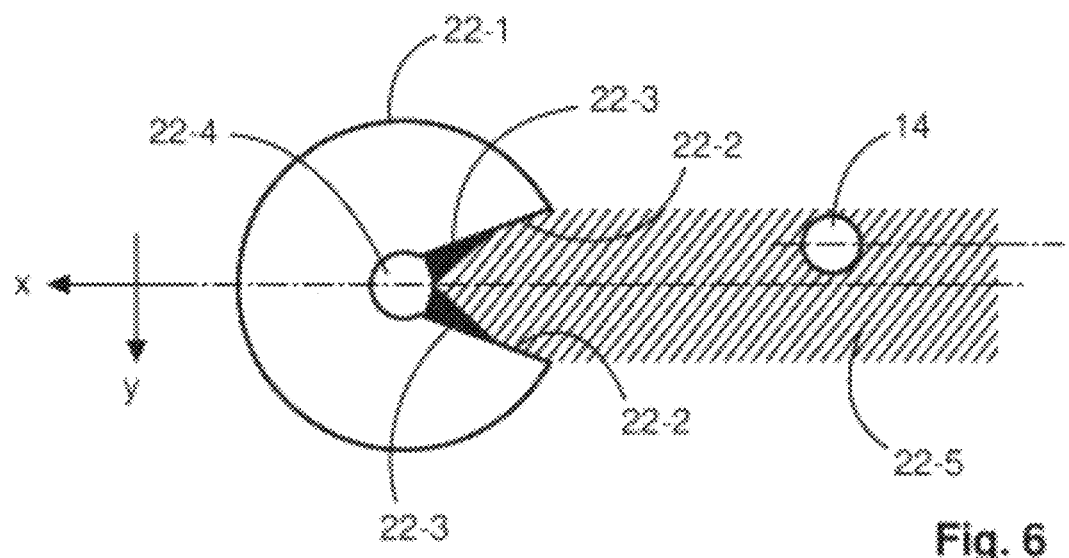
FIG. 6 shows a representation of a coupling element and a coupling counterpart in the initial situation for coupling the trailer vehicle after alignment of the towing vehicle and the trailer vehicle.

FIG. 6 shows the initial situation with the correct alignment of the towing vehicle 20 with the trailer vehicle 10. The kingpin of the trailer vehicle 10 is denoted with the reference number 14. The length direction of the towing vehicle 20 is represented by a dashed-dotted line with a coordinate cross. The length direction, also called the longitudinal direction, corresponds to the x-axis of this coordinate cross. The width direction, also called the lateral direction, corresponds to the y-axis of this coordinate cross. The hatched area 23 corresponds to the capture area 22-5 of the fifth wheel plate 22-1. The kingpin 14 is intended to be brought to the center of the fifth wheel plate 22-1. For this purpose, the fifth wheel plate 22-1 is designed in such a way that it has a V-shaped opening. The two lateral surfaces 22-2 of this V-shaped opening serve as sliding surfaces along which the kingpin 14 slides if the towing vehicle 20 does not approach the kingpin 14 quite centrally. Then the trailer vehicle 10 is moved sideways slightly, so that the kingpin 14 reaches the central position 22-4 in the middle of the fifth wheel plate 22-1. Shortly before entering the latching position, the kingpin 14 must push two latching elements 22-3 to the side so that the central point 22-4 is freely accessible. The latching elements 22-3 are held by spring force, so that resistance must be overcome in order for the kingpin 14 to engage in the central position. The towing vehicle 20 must therefore approach the kingpin 14 at a minimum speed of approx. 1 km/h so that the latching process can take place.

If the conditions in the query S2 are not yet met, the program branches back to the beginning of the program so that the query is called again in program step S2. If all queried conditions are met, a reversing movement of the towing vehicle 20 is started in program step S3 for coupling the trailer vehicle 10. To do this, the processing unit PU2 sends a command to engage a reverse gear to the transmission control unit CU2 and another command to set a motor torque to the value M1 to the motor control unit CU1.

In program step S4, the longitudinal and lateral accelerations ax and ay are detected. The measured acceleration values are sent to the processing unit PU2 by the electronic brake control unit CU4. The processing unit PU2 evaluates the acceleration values in the subsequent step S5. On the one hand, the evaluation determines whether the lateral acceleration ay occurred in a desired range between Th1 and Th2. For this purpose, the magnitude of the value of the lateral acceleration ay is compared with the two interval limits Th1 and Th2. On the other hand, it is checked whether the measured longitudinal acceleration ax is within a certain range between Th3 and Th4. These ranges are selected in such a way that the lateral and longitudinal accelerations typical of the impact of a kingpin 14 on a lateral surface 22-2 of the opening of the fifth wheel plate 22-1 of the towing vehicle 20 can be detected.

Figure 7:
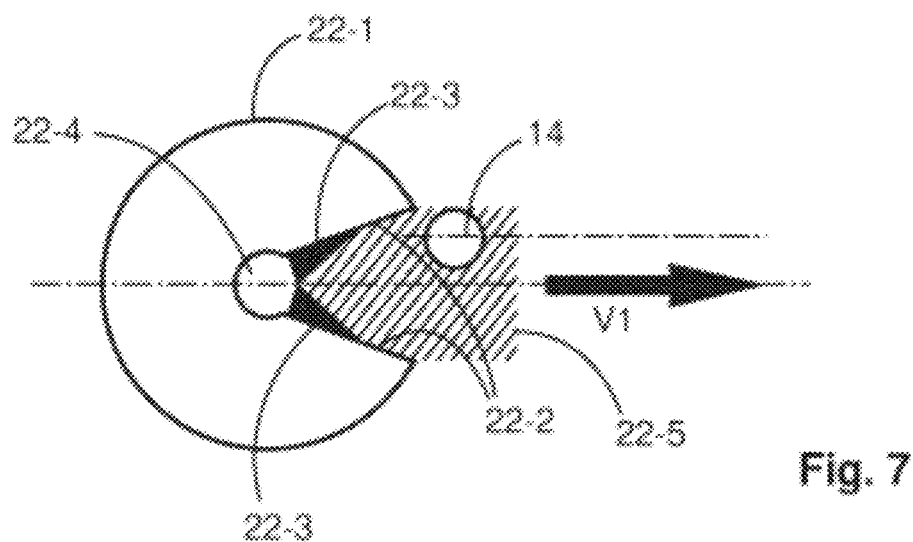
FIG. 7 shows a representation of a coupling element and a coupling counterpart during the approach of a towing vehicle to the trailer vehicle for coupling the trailer vehicle.

FIG. 7 shows the kingpin 14 approaching the fifth wheel plate 22-1, with the towing vehicle 20 moving back at the desired speed V1.

Figure 8:
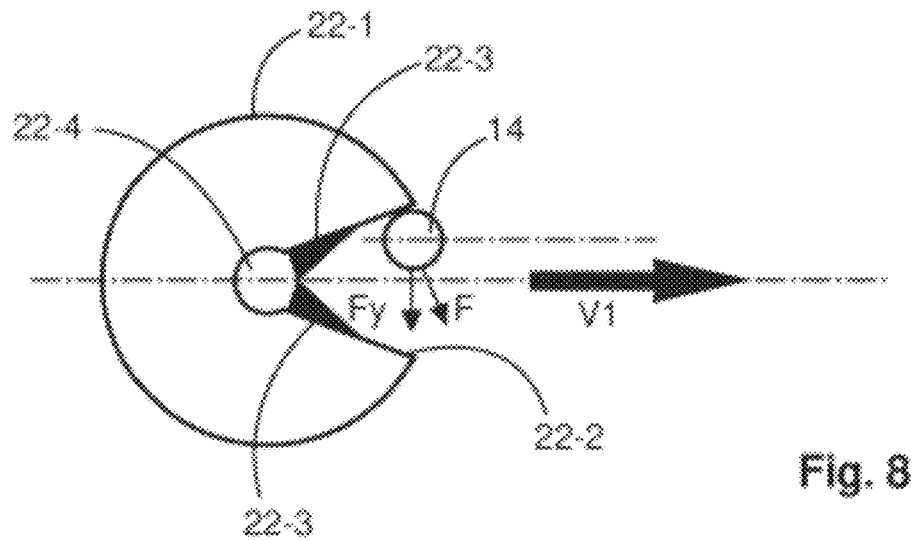
FIG. 8 shows the forces acting when the kingpin of the trailer vehicle strikes the right-hand lateral guide of the fifth wheel plate of the towing vehicle.

FIG. 8 shows the moment at which the kingpin 14 of the trailer vehicle 10 collides with the right lateral surface 22-2 of the V-shaped opening of the fifth wheel plate 22-1. The force occurring at the kingpin 14 is denoted by F. The lateral component of the force F is denoted by Fy. This is accompanied by a corresponding lateral acceleration ay of the towing vehicle 20 acting in the opposite direction. This is measured by the corresponding accelerometer of the IMU unit SU1.

If one or both conditions are not met in query S5 of the computer program, the program branches to the step S7 in which it waits for the next incoming measured values of the IMU unit SU1. Typically, the electronic brake control unit CU4 sends the measured values from the IMU unit to the processing unit PU2 at intervals of 10 ms.

If both conditions of the query S5 are met, the program continues with program step S6. In this a counter is started that counts the increments of increment signals emitted by a wheel revolution rate sensor. The purpose of counting the increments is to measure the distance that elapses from contacting the fifth wheel plate 22-1 to the impact of the kingpin 14 at the central point of the fifth wheel plate 22-1.

In the next program step S7, the longitudinal and lateral accelerations ax, ay are detected again. The step therefore corresponds to program step S4.

In the next program step S8, the number of wheel revolution rate sensor increments counted is evaluated. If the recorded number of wheel revolution rate sensor increments exceeds the value Th5, the program branches to program step S16 in which an error message is generated and displayed to the driver. In this case, a longer distance has already been covered than expected, because then the first impact on the lateral surface 22-2 has already taken place. Otherwise, the counting of increments in program step S6 would not have been started. The reference value Th5 is selected in such a way that it is only exceeded if a longer distance has been measured than the maximum possible in the event of an impact on one of the lateral surfaces 24.

Figure 11:
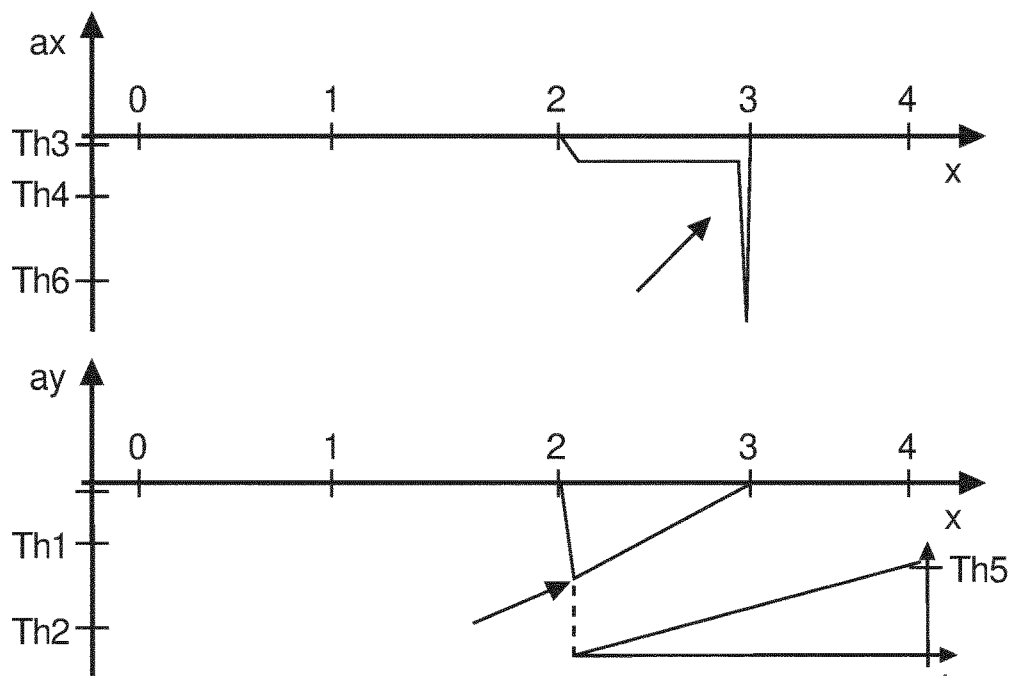
FIG. 11 shows the typical profile of the acceleration values for the measured longitudinal and lateral accelerations during the coupling process between a trailer vehicle and a towing vehicle.

If the value Th5 has not been exceeded, the detected longitudinal acceleration ax is evaluated in the following program step S9. On the one hand, it is tested whether the longitudinal acceleration ax is much greater than the magnitude of the lateral acceleration ay measured in program step S4. This condition is met when the kingpin 14 strikes the central point 22-4 of the fifth wheel plate 22-1 after sliding along a lateral surface 22-2 in the capture area 22-5 of the fifth wheel plate 22-1. FIG. 11 shows an example of how much greater the longitudinal acceleration value ax is than the lateral acceleration value typically occurring in the event of a side impact.

Figure 9:
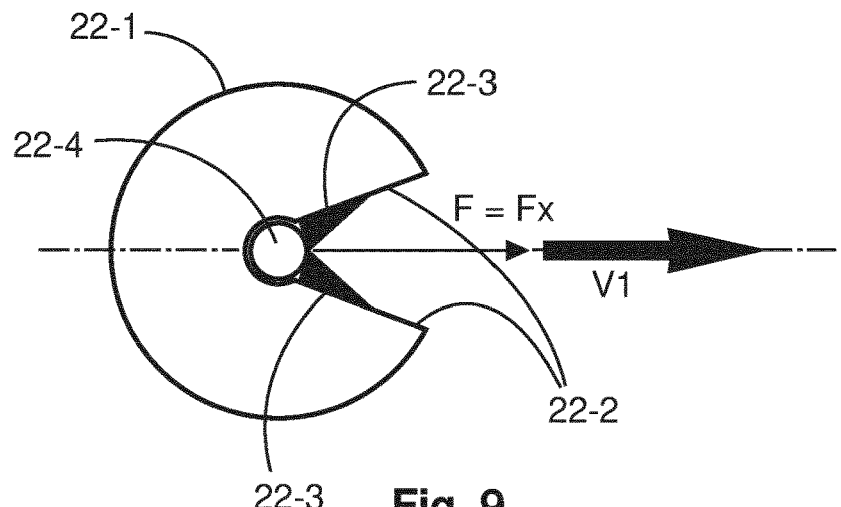
FIG. 9 shows a representation of the force acting on the kingpin of the trailer vehicle during the process of latching the kingpin at the central position of the fifth wheel plate of the towing vehicle.

FIG. 9 still shows the conditions when the kingpin 14 is engaged at the central point 22-4 of the fifth wheel plate 22-1. In this case, a high force F which has only a longitudinal component acts on the kingpin 14 on impact.

On the other hand, the query S9 evaluates whether the measured value of the longitudinal acceleration ax exceeds a limit value Th6. This condition can be met if the towing vehicle 20 is moved centrally to the trailer vehicle 10 so that the kingpin 14 meets the fifth wheel plate 22-1 at the central point 22-4 and there is no contact with the lateral surface 22-2 in the opening area of the fifth wheel plate 22-1 beforehand. If neither of the two conditions of the query S9 is met, the program branches back to program step S7 and waits for new acceleration values to be received. If one of the conditions is met, a coupling process has been detected. In the following program step S10, the motor torque is then directly reduced to the value zero and the service brake 26 of the towing vehicle 20 is actuated. This is important in order to prevent the towing vehicle 20 from pushing the trailer further, which may not be standing with the parking brake on. This could lead to damage to the supports 12 or the chassis of the trailer 10.

Thereafter, in program step S11, the counted increment numbers of the incremental encoder sensors IGS are stored in a non-volatile memory area of the processing unit PU2. These values serve as a reference for future coupling operations. A learning function can statistically evaluate these values and, for example, make a prediction according to after how many increments the kingpin 14 is likely to hit the central point 22-4 of the fifth wheel plate 22-1. This can then be used to advance shutting off the motor torque to reduce the impact of the fifth wheel plate 22-1 on the kingpin 14. In this way, impact damage can be prevented as well as possible.

In the program step S12, the service brake 26 is released by sending a corresponding control command to the electronic brake control unit CU4. A brief pulling of the trailer vehicle 10 is also started by the towing vehicle 20. To do this, a control command for engaging a forward gear must again be sent to the transmission control unit CU2. A control command to request a motor torque M2 is also sent to the motor control unit CU1. The application of the motor torque to the drive train of the towing vehicle 20 only takes place for a short time, for example for 1 s. In the next program step S13, the counting of the wheel revolution rate increments is started during the set time of 1 s. Subsequently, in the program step S14, the query is made as to whether the number of revolution rate increments counted exceeds the value of Th7. This should not be the case if the parking brake was applied to the trailer vehicle 10.

Once the successful coupling has been confirmed, the parking brake of the towing vehicle 20 is applied in program step S15. If the query S14 shows that the value Th7 is exceeded, the program branches to program step S16 in which an error message is issued to the driver. The program ends in program step S17.

In the event that the parking brake was not applied, the distance between the towing vehicle 20 and the trailer vehicle 10 at the start and end of the pulling process may be measured and a query may be provided comparing both measured values. If the difference does not exceed a tolerance value, the coupling operation was successful. The distance can be measured with a camera, ultrasonic sensors, or other measurement technology for distance measurements in the range from a few centimeters to 2 meters.

After the error message has been issued, the driver will carry out a visual inspection and, if appropriate, realign the vehicle and restart the coupling process. If the coupling is successful, he must still connect the connecting lines between the towing vehicle 20 and the trailer vehicle 10 before he can leave the depot with the coupled trailer vehicle 10.

The flow diagram for the assistance function for coupling a trailer vehicle 10 to a towing vehicle 20 was described in detail. Alternatively, a fully automatic coupling can also be implemented with an extended program. In the case of automatic coupling, the towing vehicle 20 would approach the trailer vehicle 20 at low speed. The distance between the towing vehicle 20 and the trailer vehicle 10 will be monitored. The speed is reduced to the desired value V1 as it approaches further. After that, the process is the same as for the assistance function.

Figure 10:
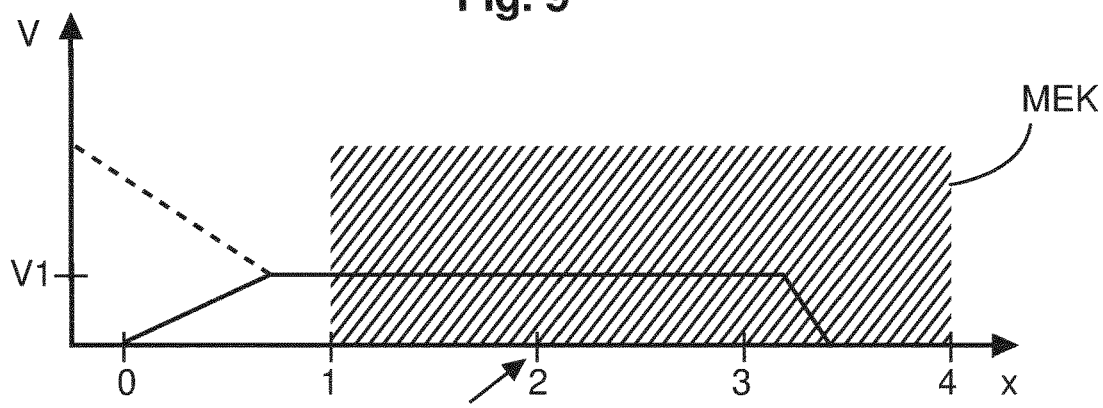
FIG. 10 shows the profile of the speed of the towing vehicle during the coupling process.

FIG. 10 shows the speed profile against the distance during the coupling process, once for the assisted coupling process with a solid line and once with a dashed line for the automatic coupling process. The hatched area MEK corresponds to the area where the first contact of the kingpin 14 with the fifth wheel plate 22-1 should be up to the impact at the central point 22-4 of the fifth wheel plate 22-1. The arrow indicates the point of the first contact.

FIG. 11 shows the typical profile of the measured acceleration values ax, ay during the typical coupling process. The distance values are plotted as shown in FIG. 10. In the case shown, the first contact of the kingpin 14 occurs at the right lateral surface 22-2 of the opening of the fifth wheel plate 22-1 at distance 2. There, a high lateral acceleration ay is measured. At the same time, a low longitudinal acceleration ax is measured. While the lateral acceleration ay decreases linearly with a further approach, the longitudinal acceleration ax remains relatively constant. At point 3 of the distance values, the kingpin 14 latches into place at the central point 22-4 of the fifth wheel plate 22-1. There, a high peak in longitudinal acceleration ax is measured. This is a factor greater than the lateral acceleration ay previously measured at point 2. In the case shown, the longitudinal acceleration at point 3 is about twice as high as the lateral acceleration measured at point 2. If no peak in the longitudinal acceleration ax is observed up to distance 4, the coupling process must be aborted by applying the service brake 26. FIG. 11 shows the thresholds Th1 to Th6 already mentioned. The exact threshold values are determined by a series of measurements on a real existing product during the execution of test coupling maneuvers. In FIG. 11, the lower diagram also shows the counting up of an increment counter. This is started by detecting a lateral acceleration ay in the range of values between the threshold values Th1 and Th2 and stopped when an impact pulse is detected in the range of values above Th6.

All examples mentioned herein, as well as conditional formulations, are to be understood as not limiting to such specifically cited examples. For example, it is acknowledged by experts that the block diagram presented here is a conceptual view of an exemplary circuit arrangement. Similarly, it can be seen that a flowchart, state transition diagram, pseudocode, and the like represent various variants for representing processes that are essentially stored in computer-readable media and thus can be executed by a computer or processor.

It should be understood that the described method and related devices can be implemented in various forms of hardware, software, firmware, special processors or a combination thereof. Specialty processors may include application-specific integrated circuits (ASICs), Reduced Instruction Set Computers (RISC), and/or Field Programmable Gate Arrays (FPGAs). Preferably, the described method and device are implemented as a combination of hardware and software. The software is preferably installed as an application program on a program storage device. Typically, it is a machine based on a computing platform that has hardware, such as one or more central processing units (CPU), random access memory (RAM), and one or more input/output (I/O) interfaces. An operating system is also typically installed on the computer platform. The various processes and functions described here can be part of the application program or a part that is executed by means of the operating system.

The disclosure is not limited to the exemplary embodiments described herein. There is room for various adjustments and modifications that the person skilled in the art would consider on the basis of his expertise as also belonging to the disclosure.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS (PART OF THE DESCRIPTION)

5 Depot
8 Control center
10 Trailer vehicle
12 Support
14 Kingpin
20 Towing vehicle
22 Coupling element
22-1 Fifth wheel plate
22-2 Lateral guide
22-3 Latching element
22-4 Central office 22-5 Capture area
24 Drive unit
26 Service brake
ax Longitudinal acceleration
ay Lateral acceleration
CM1 On-board communication module
CU1 Electronic motor control
CU2 Electronic transmission control
CU3 Electronic retarder control
CU4 Electronic brake control
CU5 Electronic driver assistance system
CU6 Electronic steering system
CU7 Electronic chassis control
DM Permanent magnet
EVU Evaluation Unit
GND Ground
IGR Increment wheel
IGS Incremental encoder sensor
HSU Hall sensor unit
M1 $1^{st}$ drive torque
M2 $2^{nd}$ drive torque
MEK Probable first contact area
PU1 Electronic processing unit (virtual driver)
PU2 Electronic processing unit (virtual driving coordinator)
SU1 IMU unit
SU2 Camera
SU3 LIDAR sensor
Th1 $1^{st}$ Threshold
Th2 $2^{nd}$ Threshold
Th3 $3^{rd}$ Threshold
Th4 $4^{th}$ Threshold
Th5 $5^{th}$ Threshold
Th6 $6^{th}$ Threshold
Th7 $7^{th}$ Threshold
S1-S17 Various program steps of a computer program
V1 $1^{st}$ Speed
V2 $2^{nd}$ Speed
VCC Supply voltage

The invention claimed is:

1. A method for assisted or automatic coupling of a trailer vehicle to a towing vehicle, wherein the towing vehicle is equipped with a coupling element which has a lateral guide for a corresponding coupling counterpart of the trailer vehicle to be inserted into the coupling element, an electronically controlled service brake and a drive unit, the method comprising:
    starting, after alignment and approach of the towing vehicle relative to the trailer vehicle, an automatic coupling process, which includes:
        starting driving in reverse at a certain speed and a certain drive torque,
        detecting longitudinal and lateral accelerations of the towing vehicle, and
        stopping driving in reverse by switching off the drive torque and/or applying the service brake based on:
            determining that a lateral acceleration occurs in a first range of values with the occurrence of a longitudinal acceleration in a second range of values;
            detecting a second longitudinal acceleration; and
            determining whether the second longitudinal acceleration is within a third range of values.

2. The method as claimed in claim 1, wherein the third range of values is at least a certain value greater than an absolute value of the previously detected lateral acceleration.

3. The method as claimed in claim 1, wherein before starting driving in reverse the level of the towing vehicle is adjusted to a height of the trailer vehicle, and
    wherein based on determining whether the coupling element is in contact with a chassis of the trailer vehicle, the coupling counterpart of the trailer vehicle is positioned in a capture area of the coupling element of the towing vehicle or there is confirmation from a driver that the trailer vehicle and the coupling element are suitably aligned.

4. The method as claimed in claim 1, wherein a certain driving torque of the drive unit of the towing vehicle is set to start driving in reverse, and a speed of the towing vehicle is controlled during driving in reverse in such a way that a specified speed is not exceeded.

5. The method as claimed in claim 1, wherein, after detecting the occurrence of the lateral acceleration in the first range of values with the occurrence of the longitudinal acceleration in the second range of values, a number of increments of an incremental encoder is detected during driving in reverse.

6. The method as claimed in claim 5, wherein the coupling process is terminated when the number of rotational increments detected during driving in reverse exceeds a certain value and no longitudinal acceleration has been measured with a value in the third range of values.

7. The method as claimed in claim 5, wherein after stopping driving in reverse the service brake is released to verify coupling, and a brief pulling of the trailer vehicle with the towing vehicle is carried out by engaging a forward gear and applying a certain drive torque for a defined time, and
    wherein during the defined time the number of increments of the incremental encoder or the distance between the towing vehicle and the trailer vehicle is measured.

8. The method as claimed in claim 7, wherein the coupling process is confirmed if the recorded number of increments of the incremental encoder does not exceed a certain value, or if the distance between the towing vehicle and the trailer vehicle measured at the end of the pulling process does not exceed the distance measured at the beginning of the pulling process by more than a tolerance value.

9. A device for controlling the assisted or automatic coupling of a trailer vehicle to a towing vehicle, wherein the towing vehicle is equipped with a drive unit and a coupling element which has a lateral guide for a corresponding coupling counterpart of the trailer vehicle to be inserted into the coupling element and an electronically controlled service brake, the device comprising:
    an electronic processing unit connected via one or more communication buses to an electronic control unit of the drive unit and the electronically controlled service brake, the electronic processing unit being equipped to communicate with the electronic control unit of the drive unit and an electronic control unit of the service brake in order to receive measured values regarding longitudinal and lateral accelerations of the towing vehicle from a sensor unit and to transmit control commands to the electronic control unit of the service brake and the electronic control unit of the drive unit,
    wherein the electronic control unit of the drive unit and the electronic control of the service brake are configured to carry out the steps of the automatic coupling process according to claim 1.

10. The device as claimed in claim 9, wherein the sensor unit which is used to measure the longitudinal and lateral accelerations of the towing vehicle is connected to the electronically controlled service brake.

11. The device as claimed in claim 9, comprising a separate sensor unit in the form of a separate Inertial Measurement Unit (IMU) which measures the longitudinal and lateral accelerations of the towing vehicle and is connected to the processing unit.

12. The device as claimed in claim 9, wherein the sensor unit includes at least a first accelerometer which detects the longitudinal acceleration of the towing vehicle and a second accelerometer which detects the lateral acceleration of the towing vehicle.

13. The device as claimed in claim 9, wherein one or more incremental encoder sensors are assigned to the electronically controlled service brake, wherein the one or more incremental encoder sensors correspond either to wheel revolution rate sensors of the towing vehicle or to revolution rate encoder sensors of a transmission of the towing vehicle.

14. The device as claimed in claim 9, wherein the coupling element of the towing vehicle includes a fifth wheel plate or a jaw coupling.

15. A towing vehicle with a drive unit and an electronically controlled service brake and a coupling element having a lateral guide for a corresponding coupling counterpart of a trailer vehicle to be inserted into the coupling element, the towing vehicle comprising the device as claimed in claim 9.

16. An electronic processing unit which can be connected via one or more communication buses to an electronic control unit of a drive unit and an electronic control unit of a service brake and which is set up to communicate with the drive unit and the electronic control unit of the service brake in order to receive measured values from a sensor unit regarding longitudinal and lateral accelerations of a towing vehicle and to send drive commands to the electronic control unit of the service brake and the electronic control unit of the drive unit, wherein the electronic control unit of the drive unit and the electronic control of the service brake are configured to carry out the steps of the automatic coupling process according to claim 1.

17. A tangible, non-transitory computer-readable medium, the computer-readable medium having program instructions which, when processed in a processor unit of a computer, lead to the steps of the automatic coupling process according to the method as claimed in claim 1 being executed.

\* \* \* \* \*